INVENTORS:
Charles D. Mecklin
William D. Lester

May 19, 1970     C. D. MECKLIN ET AL     3,512,346
COTTON PICKER DRUM COMPRESSOR SHEET WITH TORSION BAR TENSIONER
Filed Jan. 24, 1968     3 Sheets-Sheet 3
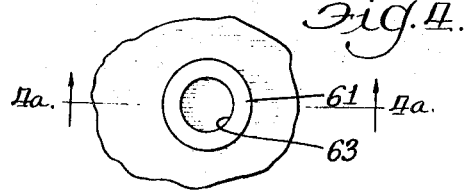
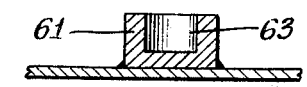
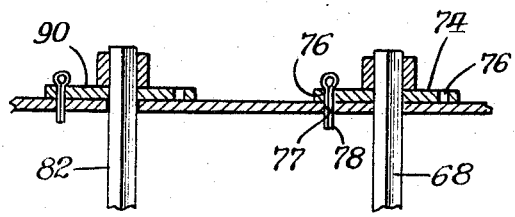
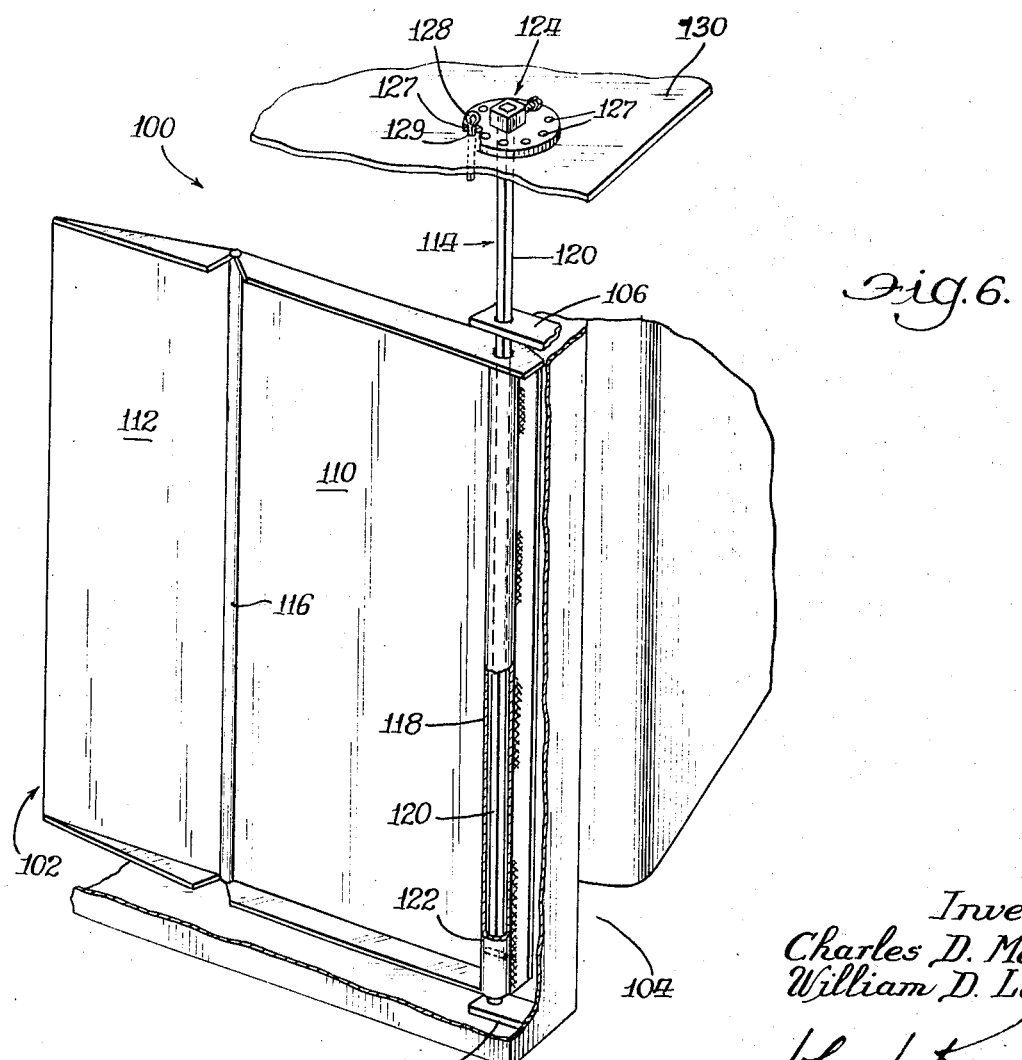
Inventors:
Charles D. Mecklin
William D. Lester
John J. Kowalik
Atty.

United States Patent Office 3,512,346
Patented May 19, 1970

---

3,512,346
COTTON PICKER DRUM COMPRESSOR SHEET WITH TORSION BAR TENSIONER
Charles D. Mecklin, and William D. Lester, Memphis, Tenn., assignors to International Harvester Company, Chicago, Ill., a corporation of Delaware
Filed Jan. 24, 1968, Ser. No. 700,176
Int. Cl. A01d *45/18*
U.S. Cl. 56—44       11 Claims

ABSTRACT OF THE DISCLOSURE

A compressor sheet assembly for a cotton harvester unit wherein torsion bar means are utilized to provide yieldablity to compressor sheets defining part of the plant passage so as to accommodate the various thickness of cotton plants to be harvested. The device herein also includes means for adjusting the tension on the compressor sheet assembly.

---

This invention relates to cotton harvesters and more specifically to improve compressor sheet construction in a picker type harvester.

The picker type cotton harvester is generally constructed as a tractor mounted unit or as a self-propelled unit which has several crop receiving tunnels or plant passages through which the cotton plants pass. As the unit is propelled over the rows of cotton plants, these plants are fed through the tunnels wherein are disposed a series of rotating picking elements which pick the open cotton and leave the unopened bolls.

In the harvesting of cotton, it is necessary to go over the fields at intervals of several weeks since the cotton plant bears fruit from the bottom, and as the plant grows, the lower branches are ready for picking while the upper branches are still green. One of the problems with some of today's high powered machines is that some of the green or unripe bolls are broken loose from the branches and fall to the ground where they are wasted. The picker element, of course do not reach the bolls that are dropped to the ground. As a means to overcome this deficiency in today's haresters, a flexible wall panel is positioned opposite the rotating picker elements so that the plant tunnel or passage is adjusted in accordance with the width or thickness of the plants. The invention herein relates to an improved flexible wall panel which contributes to an increased efficiency in the harvester unit and further reduces the amount of green boll loss.

A primary object of the present invention is to provide a new and novel means for compressing the cotton plant and holding same in the picking position.

A further object is to provide a vertically sectioned compressor wall which may be adjusted so that one section exerts more or less pressure to accommodate the variation in size of the cotton plants.

Another object is to provide a compressor sheet assembly including adjustable torsion bar spring means for providing variable yieldability to the compressor wall.

Another object is to provide torsion bar means which also serves as the hinge pivots for pivotally mounting the compressor sheet assembly on the cotton harvester housing structure.

A still further object is to provide in a harvester unit a compressor sheet assembly including an adjustable torsion bar means for varying the yieldability of the compressor sheet assembly in its position in the harvester unit and wherein the torsion bar means includes torque tube means connected to the compressor sheet assembly and a torsion bar extending into and connected to the torque tube, the torsion bar being selectively positionable to adjust the tension on the compressor sheet assembly.

The above and other objects and advantages of the invention will be more readily apparent when read in connection with the accompanying drawings in which:

FIG. 4 is a plan view of the torsion bar pivotal mounting means;

FIG. 4a is a cross section taken on the line 4a—4a of FIG. 4;

FIG. 5 is an enlarged view partially in section showing the torsion bar tension adjusting means; and FIG. 6 is a front perspective view partially broken away of a second embodiment of a compressor sheet assembly in which the compressor sheets are full length.

Figure 1:
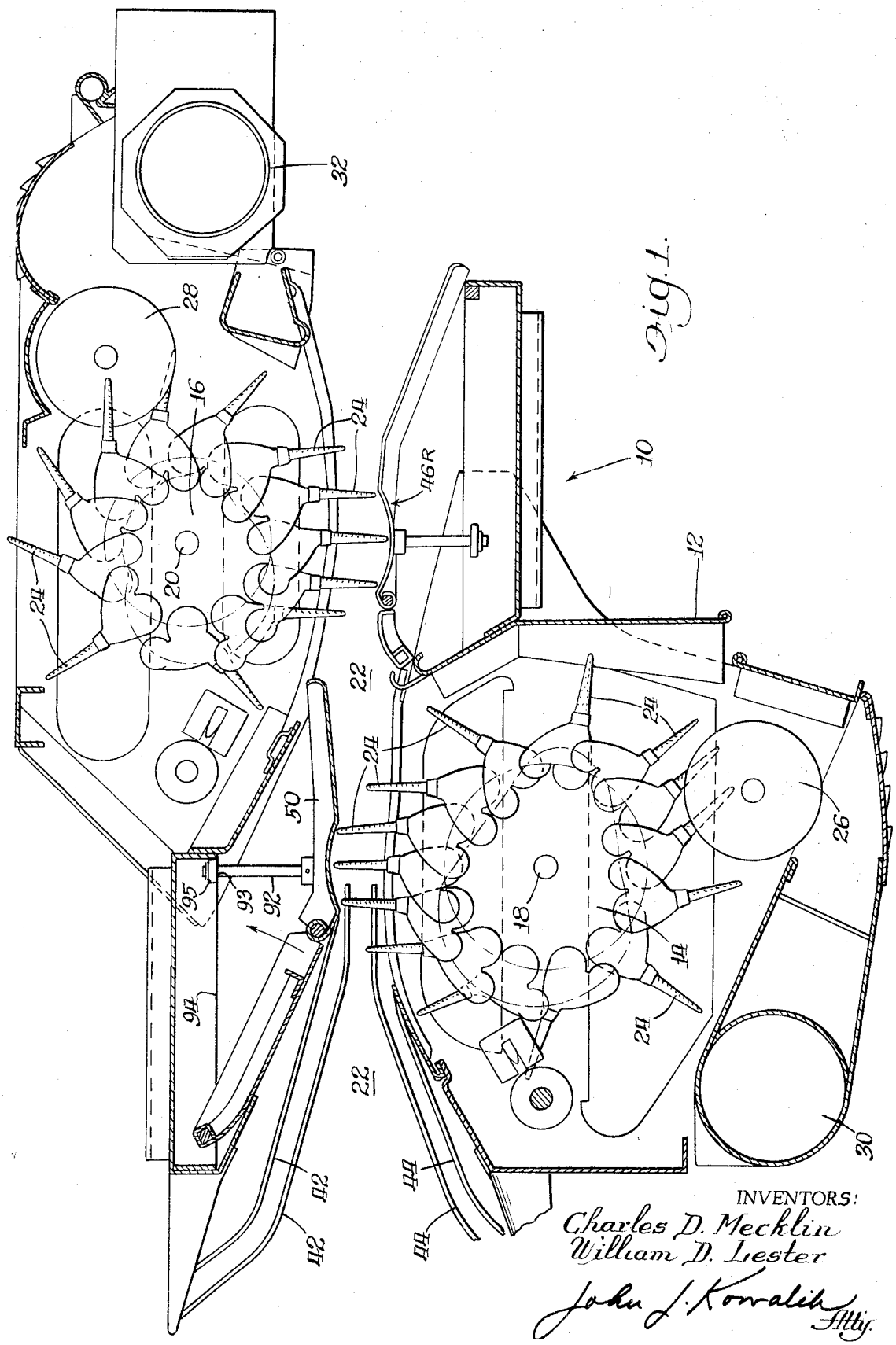
FIG. 1 is a plan view partially in section of a harvester unit showing the arrangement of picker drums, plant passage and compressor sheet assembly.

Referring now to the drawings wherein like reference characters in the several views designate the same parts, 10 designates generally a portion of a cotton harvester unit which comprises a housing structure 12. Cotton picking rotors 14 and 16 are rotatably supported in the housing structure for rotation on vertical axes 18 and 20 respectively and a plant passage or tunnel 22 extends through the harvester unit. The cotton picking rotors 14 and 16 each are equipped with cotton picking spindles 24 which extend laterally into the plant passage 22 and rotate on their own axes to pick cotton from the plants as the latter pass through the plant passage. The rotors 14 and 16 rotate in clockwise and counterclockwise directions respectively as viewed in FIG. 1, in other words, from the front to the rear of the harvester unit. Doffers 26 and 28 are arranged adjacent rotors 14 and 16 respectively to remove cotton from the spindles 24 and discharge it to suction outlet pipes 30 and 32 respectively.

At the forward portion of the housing structure the vertically extending plant passage 22 is relatively wide and the two vertically extending walls 34 and 36 defining the passage 22 converge as they extend rearwardly. Plant lifters 38 and 40 are connected to the forward part of the housing structure on each side of the opening to the plant passage to help guide the cotton plants into the plant passage 22 as the harvester unit moves forward through the field. Lifting rods 42 and 44 also help to lift the plants into the passage 22.

The wall 34 is a vertically extending compressor wall and includes a compressor sheet assembly 46 which is yieldable to accommodate the varying width of the cotton plants as they are encountered in the path of the harvester unit.

The compressor sheet assembly 46 includes an upper front panel 48, an upper rear panel 50, a lower front panel 52 and a lower rear panel 54. The upper front and rear panels 48 and 50 are hinged to each other by the hinge 56 and the lower front and rear panels are hinged to each other by hinge 58, enabling the upper panels to pivot or swing a limited amount with respect to each other and enabling the lower panels to pivot or swing a limited amount with respect to each other.

Figure 2:
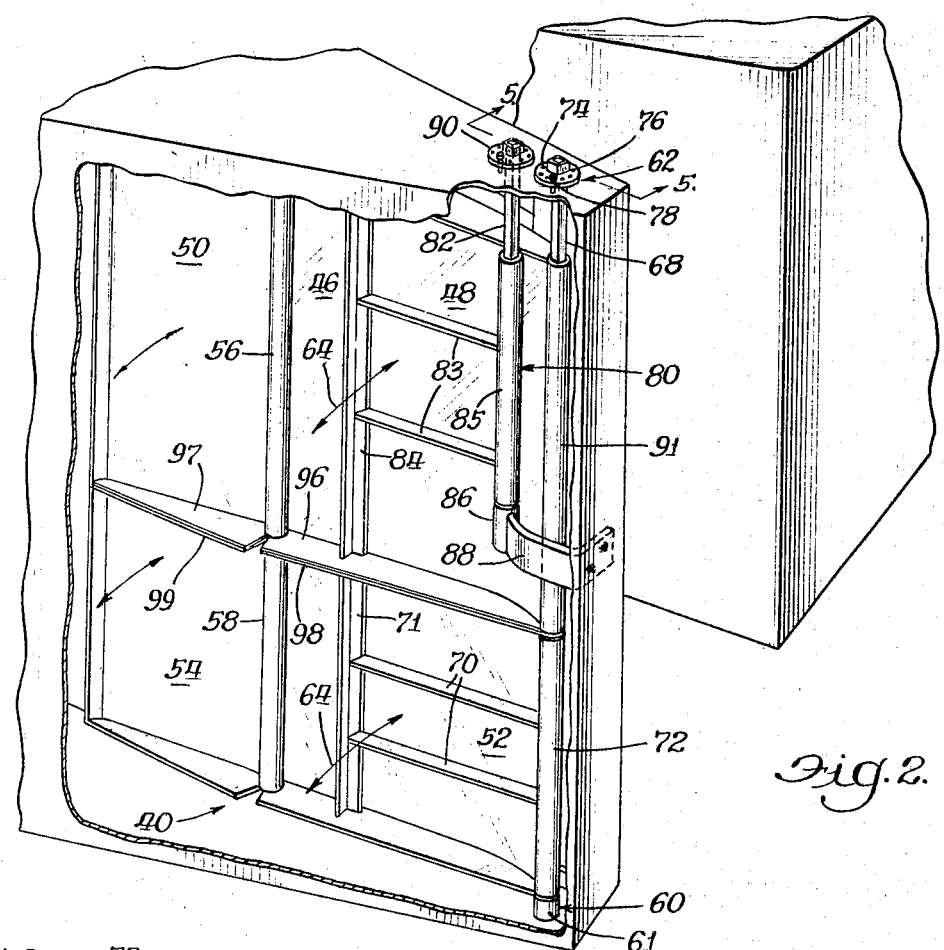
FIG. 2 is a front perspective view partially broken away showing the compressor sheet assembly and adjustable torsion bar means.

The compressor sheet assembly 46 is pivotally mounted on the forward portion of the housing structure 12 by pivotal mounting means 60 at the bottom and pivotal mounting means 62 at the top so that the assembly may swing slightly about the pivots as indicated by the arrows 64 in FIGURE 2. The pivotal mounting means 60 may comprise a small mounting block 61 secured to the housing structure 12 by suitable means such as by welding and having formed therein, an annular recess 63 for receiving the rounded end of a vertically extending torsion rod so that the torsion rod may freely pivot therein.

The compressor sheet assembly 46 includes a torsion bar spring means 66 which is operatively associated with the lower panel group and comprises a torsion rod 68 preferably of a non-round construction and here shown as being of square cross-section. The assembly 46 also includes torsion arms 70 which are fixed to vertically extending angle iron 71, and the lower front panel 52. The angle iron 71 also is fixed to the panel 52. A tubular element 72 is attached to the forward edge of panel 52. The torsion rod 68 extends through the element 72 and is pivotally journalled at its lower end in mounting block 61. The inside of the tubular element 72 is a complementary configuration to the cross-sectional shape of the torsion rod 68 so that the torsion rod cannot rotate relative to the tubular element 72. It will be appreciated that other means may be used to secure the torsion rod against relative rotation with respect to the tubular element 72. The torsion arms 70 are fixed at their forward ends to the tubular element 72.

On index plate 74 having a plurality of positioning holes 76 is fixed to the upper end of the torsion rod 68 which extends up through the housing structure 12 as clearly seen in FIGS. 2 and 5. The torsion rod 68 and attached index plate 74 may be turned to a plurality of positions and secured in one of those positions by a suitable arrangement such as a pin 78 projecting through one of the positioning holes 76 in the index plate and a mating opening 77 in the housing structure as shown in FIG. 5. Thus by varying the position of the torsion rod 68, the lower panel 52 may be positioned at different angles in the plant passage to accommodate different size plants which enter the plant passage. As the index plate 74 and torsion rod 68 are turned clockwise as viewed in FIG. 2, the panel 52 attached thereto through tubular element 72, torsion arms 70 and angle iron 71 is also moved clockwise, i.e., further into the plant passage 22. As a cotton plant moves into the plant passage, the compressor sheet panel 52 is moved counterclockwise twisting the torsion rod 68, the upper end of which is fixed by the index plate and the lower end of which is free to rotate in the mounting block 61. It will be appreciated that when the panel 52 is positioned further into the plant passage, the torsion force that must be applied to the torsion rod 68 by a given size cotton plant is greater than if the panel 52 is positioned not so far into the plant passage. The torsion rod 68 extending through the tubular element 72 also forms part of the hinge arrangement for lower front panel 52.

The compressor sheet assembly 46 also includes a second torsion bar spring means 80 operatively associated with the upper panel group which includes panels 48 and 50. The torsion bar spring means 80 comprises a torsion rod 82 and substantially horizontally extending torsion arms 83 which are connected at their rear ends to substantially vertically extending angle iron 84 and at their forward ends to a tubular member 85 which in turn surrounds torsion rod 82. Torsion rod 82 and tubular member 85 are fixed with respect to each other so that the two are not rotatable with respect to each other just as torsion rod 68 and tubular element 72. The torsion rod 82 is rotatably journalled in mounting 86 carried by bracket 88 in a manner similar to the lower end of torsion rod 68 being journalled in mounting block 61. Bracket 88 is connected to the housing structure 12 by suitable means such as by welding. The upper end of torsion rod 82 is journalled in the upper portion of the housing structure 12 in the same manner as torsion rod 68. Also torsion rod 82 has an index plate 90, similar to index plate 74, attached to the upper end thereof. Thus torsion rod 82 may be similarly turned and positioned in a manner similar to torsion rod 68 by means of the index plate 90 thereby varying the yieldability of the upper panel 48 as it accommodates different size plants entering the plant passage. A tubular hinge member 91 is fixed to the forward edge of panel 48 and the torsion rod 68 extends therethrough in a manner such that rod 68 is rotatable relative to the hinge member 91 thus providing pivotal support for the upper panels 48 and 50. Unlike angle iron 71 connected to panel 52, angle iron 84 is not fixed to panel 48, but slides therealong as the compressor sheet panel 48 is moved to different positions when the torsion rod 82 is turned to different positions. This is so because the axis of the torsion rod 82 does not coincide with the pivotal axis of panel 48 but rather is spaced therefrom in a rearwardly direction as clearly seen in FIG. 2. The tubular element 85 also is not fixed to the panel 48.

Both the upper panel group, i.e., panels 48 and 50 and the lower panel group, i.e., panels 52 and 54 are equipped with limit stops one of which is seen in FIG. 1 and designated by reference character 92. As shown in FIG. 1, limit stop 92 comprises a rod-like member which is secured at its one end to upper panel 50. The other end projects through an opening 93 in a beam member 94 and is equipped with an enlarged end 95 which may comprise a large nut secured on the end of the rod-like member. It will be apparent from FIG. 1 that rear upper panel 50 is limited in the distance it may move into plant passage 22 by the abutment of the enlarged end 95 against the beam 94. A similar limit stop arrangement is associated with the rear lower panel 54.

To put increased load or tension on either the upper or lower panel group of the compressor sheet assembly, the index plates 74 and 90 are turned clockwise as viewed in FIG. 2. The upper and lower panel groups may be tensioned independently of each other.

Because of the nature of cotton crops wherein lighter and less dense growth is at the top and the heavier growth is at the bottom, it may be desirable to put a different amount of tension on the torsion bar spring means 68 and 80. Generally more yieldability is desired for the lower panel members of the compressor sheet assembly. In that event the upper and lower panel groups will move to different positions. If the upper panel 48 and lower panel 52, for example, were merely coextensive sheets, there would occur under those conditions a parting of the upper and lower panel members at their adjacent edges at the middle of the compressor sheet assembly. Such an opening would permit cotton plant branches to lodge in the opening and be broken off. In order to avoid this difficulty, laterally extending flanges 96, 97, 98 and 99 are formed respectively on panels 48, 50, 52 and 54. These flanges, as is apparent from FIG. 2, extend inwardly into the housing and away from the plant passage. The flanges are positioned very close to each other and are wide so that portions thereof always overlap as the upper and lower panels take position in different vertical planes with respect to each other. Thus no opening is permitted at the mating edges of the upper and lower panel groups which would permit plant branches to be lodged therebetween and be broken off.

FIG. 6 illustrates a second embodiment of the invention wherein torsion bar spring means are used with full length compressor sheets. The same principle for adjusting the tension on the torsion bar spring means is used as with the embodiment of FIGS. 1–5.

In FIG. 6 there is shown a portion of a housing structure 100 of a cotton harvester, a compressor sheet assembly 102 pivotally mounted on the housing structure and disposed along and defining in part a plant passage 104. Positioning lugs 106 and 108 connected by suitable means to the housing structure provide pivotal support for the compressor sheet assembly 102.

The compressor sheet assembly 102 comprises front and rear vertically extending panel members 110 and 112 and torsion bar spring means 114 for tensioning the panel members as cotton crops of various sizes pass through the plant passage. Panel members 110 and 112 are pivotally hinged to each other by the hinge 116.

The torsion bar spring means 114 includes a torque tube 118 fixed to the forward edge portion of the front panel 110 by suitable means such as by welding and a torsion rod 120 which extends through the torque tube 118. The opposite ends of the torsion rod extend through holes in the upper and lower positioning lugs 106 and 108 thereby providing the pivotal support for the compressor sheet assembly. The torsion rod 120 is secured to the inside of the torque tube 118, preferably at the lower end thereof as shown at 122. This may be done by welding, bolting or other suitable means. The torsion rod is of a smaller diameter than the inside of the torque tube so that except for the position at which it is secured to the torque tube it can rotate relatively to the torque tube. Thus turning the torsion rod 120 clockwise moves the panels 110 and 112 farther into the plant passage 104 and cotton plants moving into the plant passage move the compressor sheet assembly 102 counterclockwise against the torsion force in torsion rod 120.

Figure 3:
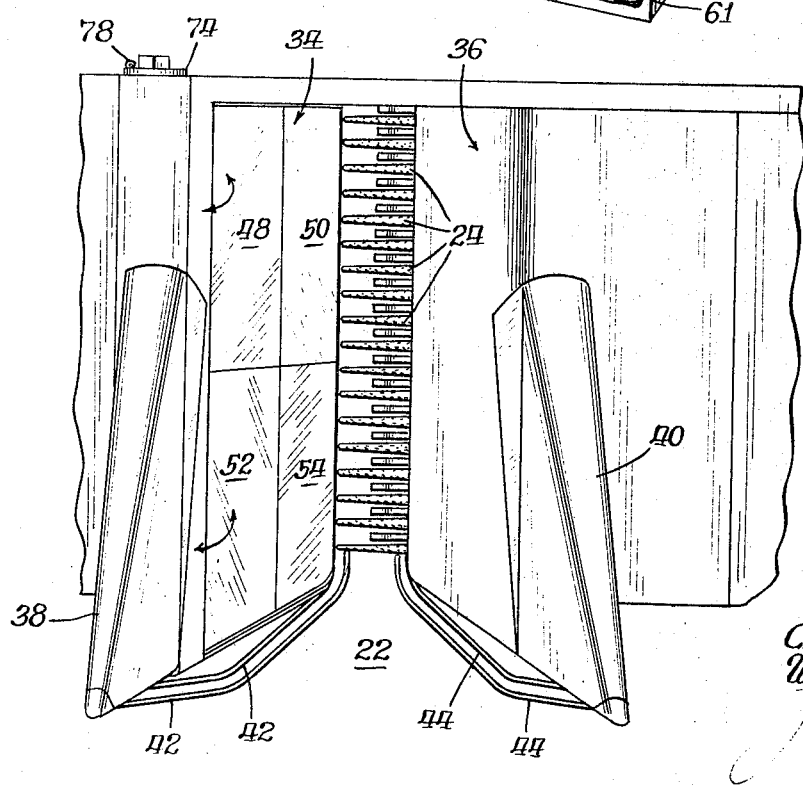
FIG. 3 is a front elevation view showing picker elements of the picker drum projecting into the plant passage or tunnel.

The torsion bar spring means 114 is adapted to have the tension thereon selectively adjusted in a manner similar to that used in the embodiment illustrated in FIGS. 1–3. A tension adjusting means 124 similar to that illustrated in connection with the first embodiment comprises an index plate 126 secured to the upper end of torsion rod 120. This index plate has a plurality of positioning holes 127 so that a pin member 128 inserted through a selected one of them and through a matching opening 129 in the top plate member 130 of the housing structure 100 will secure the torsion rod 120 in one of a plurality of desired positions to vary the yieldability of the front panel 110 of the compressor sheet assembly. Limit stops similar to those designated by reference character 92 in FIG. 1 may also be used in connection with the structure shown in FIG. 6.

It will be realized that the rear compressor sheet assembly 46R is essentially like the front except for dimensions. It will be apparent from the above that I have advantageously provided an improved compressor sheet assembly for a cotton harvester wherein the tension on the compressor sheets can be conveniently adjusted to accommodate large variations in crop growth. Furthermore, the torsion bar structure is of sturdy construction requiring substantially no maintenance and is not subject to the mechanical difficulties inherent in the use of a multiplicity of small coil springs. In the embodiment using upper and lower panels in the compressor sheet assembly, overlapping flanges at the mating inner edges of the upper and lower panels advantageously prevent undesirable stripping of branches from the plants.

We claim:

1. In a cotton harvester the combination comprising:
a housing structure defining a vertically extending plant passage therein;
vertically disposed cotton picking drum means mounted in said housing structure for rotation about a substantially vertical axis, said drum means being equipped with cotton picking elements extending laterally therefrom to project into said plant passage during rotation of said drum means;
compressor sheet assembly means pivotally supported on said housing structure, said compressor sheet assembly means defining a portion of said plant passage; and torsion bar spring means; comprising a vertical torsion rod serving as a hinge pivot operatively connected with said compressor sheet assembly means for yieldably positioning said compressor sheet assembly means and twisting to permit movement of the compressor sheet assembly transversely of the passage.

2. The combination of claim 1 including adjustable means connected between the housing and said torsion bar spring means for varying the loading of said torsion bar spring means and said compressor sheet assembly means whereby the force required to move said compressor sheet assembly to a predetermined position is selectively varied.

3. The combination of claim 2 wherein said compressor sheet assembly means includes front and rear panel member means pivotally connected to each other.

4. The combination of claim 3 wherein said torsion bar spring means is connected to said front panel member means.

5. The combination of claim 4 wherein said torsion bar spring means includes a vertically extending torque tube connected to said front panel member, and said torsion rod extending into said torque tube and connected thereto.

6. The combination of claim 4 wherein said torsion bar spring means includes torsion arms operatively associated with said front panel member means and operatively connected to said torsion rod.

7. The combination of claim 3 wherein said front and rear panel member means each comprise separate upper and lower sections.

8. The combination of claim 7 wherein said torsion bar means includes separate torsion bar means for said upper and lower sections which independently yieldably load said upper and lower panel sections of said front panel member.

9. The combination of claim 7 wherein said torsion bar means includes a vertically extending torque tube connected to said lower section of said front panel member means and said torsion rod extending into said torque tube and connected thereto, and further includes a second vertically extending torque tube operatively associated with said upper section of said front panel member means and a second torsion rod extending into said second torque tube.

10. In a cotton harvester the combination comprising:
a housing structure defining a vertically extending plant passage therein;
vertically disposed cotton picking drum means mounted in said housing structure for rotation about a substantially vertical axis, said drum means being equipped with cotton picking elements extending laterally therefrom to project into said plant passage during rotation of said drum means;
compressor sheet assembly means pivotally supported on said housing structure, said compressor sheet assembly means defining a portion of said plant passage; and torsion bar spring means operatively associated with said compressor sheet assembly means for yieldably positioning said compressor sheet assembly means,
adjustable means for varying the position of said torsion bar spring means and said compressor sheet assembly means whereby the force required to move said compressor sheet assembly to a predetermined position is selectively varied, and
said torsion bar means includes a vertically extending torque tube connected to said compressor sheet assembly, and a torsion rod extending into said torque tube and connected thereto.

11. In a cotton harvester the combination comprising:
a housing structure defining a vertically extending plant passage therein;
vertically disposed cotton picking drum means mounted in said housing structure for rotation about a substantially vertical axis, said drum means being equipped with cotton picking elements extending laterally therefrom to project into said plant passage during rotation of said drum means;
compressor sheet assembly means pivotally supported on said housing structure, said compressor sheet assembly means defining a portion of said plant passage; and torsion bar spring means operatively associated with said compressor sheet assembly means for yieldably positioning said compressor sheet assembly means,
adjustable means for varying the position of said torsion bar spring means and said compressor sheet assembly means whereby the force required to move said compressor sheet assembly to a predetermined position is selectively varied, and said compressor sheet assembly means includes vertically extending upper and lower panel means disposed edge to edge, and laterally extending flange means connected to adjacent edges of said upper and lower panel means whereby said upper and lower panel means may swing relative to each other a predetermined amount without any opening developing therebetween.

References Cited

UNITED STATES PATENTS

| 2,830,427 | 4/1958 | Odom | 56—44 |
| 3,035,388 | 5/1962 | Sarlls | 56—42 |
| 3,047,996 | 8/1962 | Hubbard | 56—41 |
| 3,103,092 | 9/1963 | Templeton | 56—44 |
| 3,316,697 | 5/1967 | Hubbard | 56—44 |

RUSSELL R. KINSEY, Primary Examiner